United States Patent [19]

Kolff

[11] Patent Number: 4,756,789
[45] Date of Patent: Jul. 12, 1988

[54] TOOL FOR APPLYING GLASS INSULATING STRIPS

[75] Inventor: John C. Kolff, Abbotsford, Canada

[73] Assignee: Peak Distributing Limited, Abbotsford, Canada

[21] Appl. No.: 65,912

[22] Filed: Jun. 24, 1987

[30] Foreign Application Priority Data

May 26, 1987 [CA] Canada .................................. 538017

[51] Int. Cl.[4] ........................ B32B 31/20; B32B 35/00
[52] U.S. Cl. .................................. 156/391; 156/574; 156/579
[58] Field of Search ............... 156/579, 574, 107, 391, 156/523, 577

[56] References Cited

U.S. PATENT DOCUMENTS

| | | | |
|---|---|---|---|
| 2,916,079 | 12/1959 | Schiefer | 156/391 |
| 3,730,815 | 5/1973 | Terzian | 156/579 |
| 4,600,466 | 7/1986 | Herrmann | 156/579 |
| 4,623,421 | 11/1986 | Cardin | 156/523 |
| 4,699,686 | 10/1987 | Franke | 156/574 |

Primary Examiner—Michael Wityshyn
Attorney, Agent, or Firm—Barrigar & Oyen

[57] ABSTRACT

A tool for applying insulating strip such as SWIGGLE STRIP TM used to seal double-paned glass is disclosed. The tool has a guide which slides along the edge of the pane and rollers which guide the strip through the tool and press it against the surface of the pane.

7 Claims, 3 Drawing Sheets

TOOL FOR APPLYING GLASS INSULATING STRIPS

BACKGROUND OF THE INVENTION

The invention relates to a tool for applying the insulating strip which separates the two panes of glass in double-glazed glass.

The manufacture of double-glazed insulating glass for use in residential windows and the like requires the use of sealed spacers along the edges of the glass between the two panes to maintain the separation, and a desiccant to prevent the condensation of moisture between the two panes. A successful form of insulating strip has been a product sold by Tremco Ltd. under the trade mark SWIGGLE STRIP. This form of insulating strip combines the spacer, sealant and desiccant in one strip. It is an extruded butyl-based thermo-plastic strip which contains a corrugated aluminum spacer and desiccant. The strip is rectangular in cross-section, and is sold in a number of standard sizes from $\frac{1}{4}''\times\frac{1}{4}''$ to $\frac{1}{4}''\times\frac{3}{8}''$. It is sold in a continuous roll on a paper tape backing.

SWIGGLE STRIP (referred to hereafter simply as "insulating strip" or "strip") has been found to be a convenient product in the manufacturing of double-glazed windows. The product at room temperature has considerable adhesive properties. In the past it has been applied by hand, by rolling the strip off the roll, aligning it along the edge of the glass by hand and pressing the strip down to adhere it to the glass. Once the strip has been applied around the entire perimeter of the first pane of glass, the second pane is placed on top of the strip, and the entire unit is heated to bond the strip to the glass, and the two panes are pressed together. This application by hand is a time-consuming procedure, and in the past it has taken approximately seven minutes for two pieces of glass to be joined into a double-paned unit from washing to the stage where the glass is ready to be installed on a frame.

The present invention provides a tool for applying the strip to the glass which greatly reduces the time required for assembling double-glazed windows. For example, the window which previously required seven minutes to manufacture can now be done in approximately one minute using the invention.

SUMMARY OF THE INVENTION

The invention is directed to a tool for applying an adhesive strip to a planar surface where the surface has an edge perpendicular to the surface. The tool comprises a body portion having a handle and a lower surface adapted for sliding contact with the planar surface. A portion of the lower surface forms a passageway opening downwardly and open at either end whereby the strip may pass between the body portion and the planar surface. A guide is attached to the body and has a straight edge adapted to slidably contact the perpendicular edge of the planar surface. The tool further comprises means connected to the body portion and mounted adjacent and parallel to the straight edge of the guide for guiding the placement of the strip onto the planar surface. Further, according to one aspect of the invention the means for guiding the strip comprise one or more pairs of rollers which rotate about parallel vertical axes. Also according to one aspect of the invention the body portion of the tool slides along the planar surface on a roller having a horizontal axis of rotation perpendicular to the edge of the planar surface. Also according to a further aspect of the invention a roller is provided to contact the upper edge of the strip as it passes through the tool, thereby pressing the strip down onto the planar surface.

BRIEF DESCRIPTION OF THE DRAWINGS

In drawings which illustrate an embodiment of the invention.

DETAILED DESCRIPTION OF AN EMBODIMENT OF THE INVENTION

Figure 1:
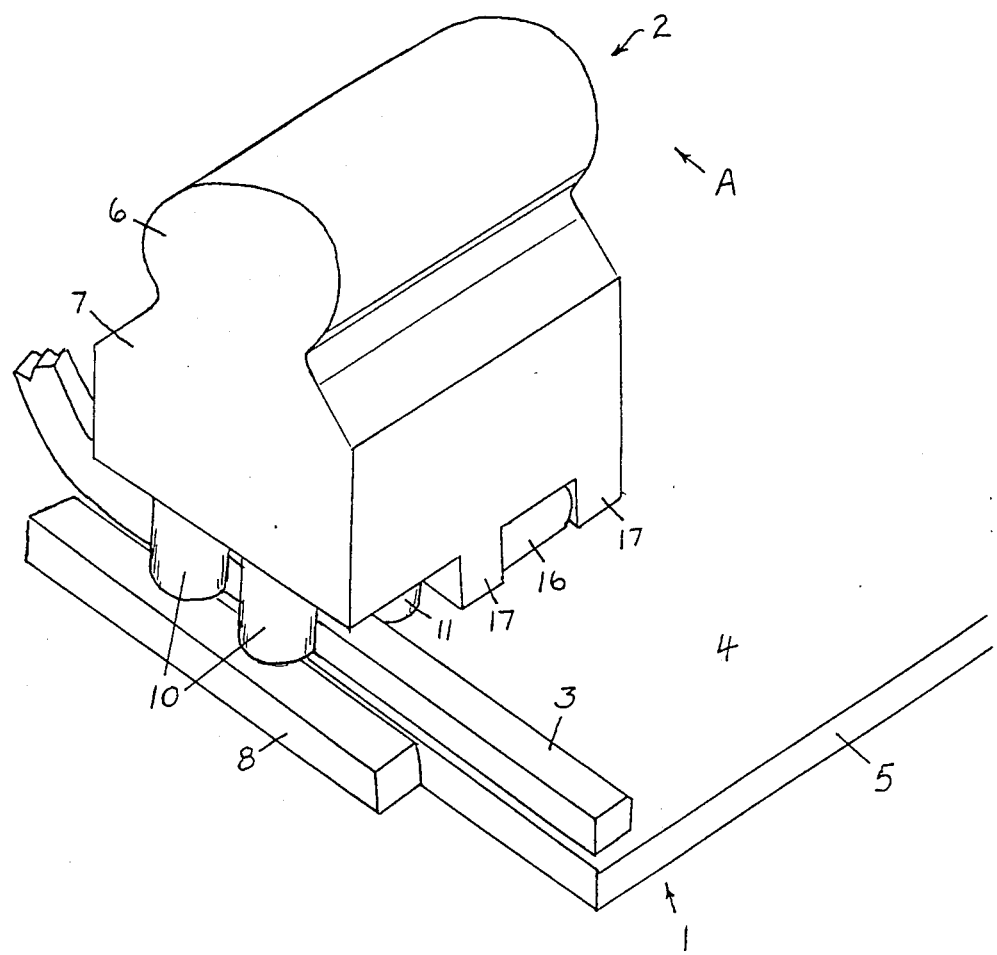
FIG. 1 is a perspective view of the tool of the invention in position on a pane of glass for applying an insulating strip.

Referring to FIG. 1, a pane of glass is designated as 1, the tool of the invention as 2 and the insulating strip as 3, preferably a SWIGGLE STRIP. The pane of glass is laid horizontally for applying the SWIGGLE STRIP around the edges of the pane. Subsequently, a second pane of glass will be laid on top of the insulating strip 3 and the sandwich of glass heated and pressed to seal the insulating strips 3 to the glass. The pane 1 has a planar top surface 4 and a perpendicular edge 5.

Referring to FIGS. 1 through 5, the tool 2 has a handle portion 6 formed on the tool body 7 contoured and shaped to receive the hand of the worker. A guide 8 is secured to the body of the tool by screws 9 (shown in dotted outline). Mounted on screws 9 for rotation are two rollers 10. A second pair of rollers 11 is secured to the body 7 of the tool by screws 12 (shown in dotted outline). Rollers 10 and 11 are preferably of TEFLON (trademark of duPont for polytetrafluoroethylene) or similar low-friction material to prevent sticking to the insulating strip 3. They are mounted in parallel pairs, and a single pair would also function, as would more than two pairs. The rollers 10 and 11 form a passageway 13 beneath body portion 7 which is slightly wider than the insulating strip 3.

Guide 8 may also be of TEFLON low-friction material or similar material. The inner edge 14 of guide 8 is flat to slide along the vertical edge 5 of the pane of glass. Rollers 10 are positioned so that the inner circumference of roller 10 is slightly inward from edge 14 to provide a small space 15, on the order of 1/16th of an inch, between the edge 5 of the glass and the edge of the insulating strip 3.

A further pair of rollers, which also may be made of low-friction material for reduced friction, is shown at 16. Rollers 16 are mounted between lower extensions 17 of the body portion 7. They rotate on a screw 18 (shown in dotted outline) which secures the rollers in position. The lower edge of rollers 16 and 10 extend slightly below the lower edge of rollers 11 so that the tool when sliding across the plate of glass rides predominantly on the rollers 16, and may also slide on a portion of the lower edge of roller 10, but not on the lower edge of roller 11.

Figure 2:
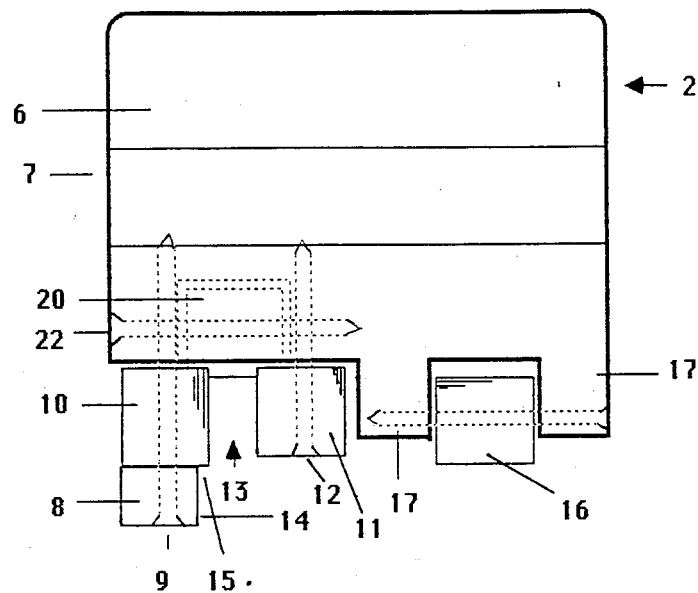
FIG. 2 is a view of the invention in direction A of FIG. 1.
Figure 3:
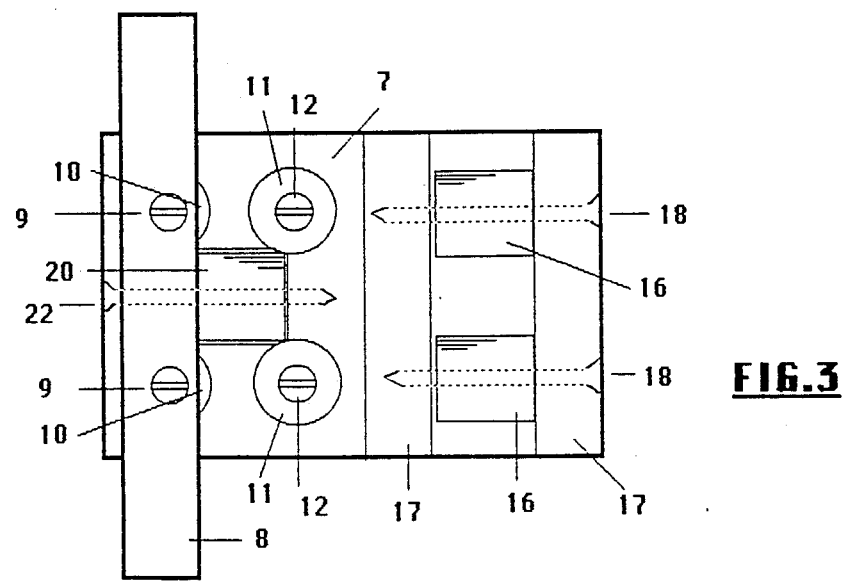
FIG. 3 is a bottom view of the invention.
Figure 4:
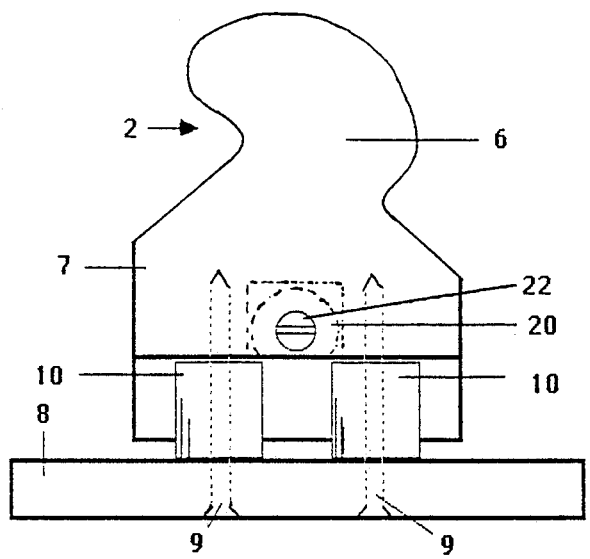
FIG. 4 is a left side view of the invention.
Figure 5:
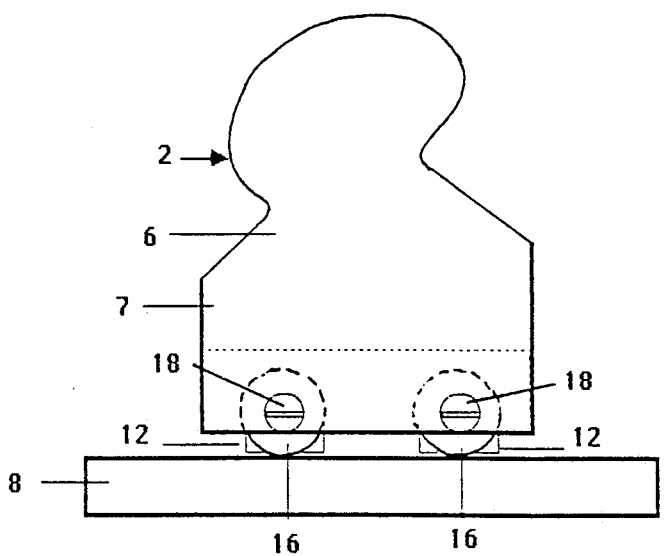
FIG. 5 is a right side view of the invention.

An additional roller 20, is shown in FIG. 3 and in dotted outline in FIGS. 2, 4 and 5. Roller 20 is secured in a cavity in the body portion 7 by screw 22 (shown in dotted outline). The lower edge of roller 20 is positioned so that it presses down slightly on the top edge of the strip 3 when the strip is applied using the tool.

In operation, the starting end of the line of the strip 3 is laid in position on the surface 4 of the glass adjacent edge 5, and tool 2 is placed over the strip 3 so that the strip passes along passageway 13, with edge 14 of the guide 8 bearing against edge 5, and the lower surface of roller 16 also bearing on surface 4 of the pane of glass. In this position roller 20 presses down slightly on the top surface of the strip 3. The tool is then drawn along the pane of glass, pressing guide 8 against edge 5 and roller 16 down on the top surface 4 of the pane. In this manner, a certain amount of pressure is placed on the strip 3 sufficient to adhere it to the top of the pane of glass, and rollers 10 and 11 guide the strip to the proper location in a straight line adjacent to the edge of the pane. When the tool reaches a corner of the glass, it is raised, the strip 3 is turned 90 degrees, the tool is placed in position again on the next perpendicular edge, and the operation is continued.

As will be apparent to those skilled in the art, various modifications and adaptations of the tool abovedescribed are possible without departing from the spirit of the invention, the scope of which is defined in the appended claims. The body portion of the tool may be formed of wood, plastic or any other suitable material. While TEFLON low-friction material has been specified for the rollers and guide 8, other materials having a low co-efficient of friction will be suitable, as will be apparent to those skilled in the art. Similarly, while screws have been shown to mount the various rollers in the tool, other means of mounting the rollers for rotation in their respective positions will be apparent. Similarly, the same results may be achieved using different numbers and configurations of rollers, or stationary sliding surfaces may be substituted for rollers.

The embodiments of the invention in which an exclusive property or privilege is claimed are defined as follows:

1. A tool for applying a flexible thick adhesive strip to an upper planar surface of an article having an outer edge perpendicular to the upper surface, said tool comprising:
   (a) a tool body provided with an upper handle portion and having
   (b) a lower surface for free sliding contact with said upper planar surface;
   (c) tool guide means attached to said body and extending beyond said lower surface, having an inwardly-facing guiding edge for sliding contact with the perpendicular outer edge of said article; and
   (d) strip guide means connected to said body and mounted adjacent to said guiding edge of said tool guide means for guiding the placement of said strip on said planar surface
   said lower surface of said body and said strip guide means forming a passageway parallel to said guiding edge of said tool guide means and opening downwardly and open at either end, whereby said strip may pass between said lower surface of said body and said upper planar surface,
   said strip guide means comprising two parallel roller means forming a space between them having a width slightly greater than the width of said strip, said roller means being mounted for rotation about axes perpendicular to said upper planar surface and parallel to said perpendicular edge when the tool is in operation.

2. The tool of claim 1 wherein siad lower surface of said body comprises roller means mounted for rotation in said body about an axis of rotation parallel to said planer surface and perpendicular to said perpendicular edge of said upper planar surface of said article.

3. The tool of claim 1 wherein said strip guide means comprises a polytetrafluoroethylene.

4. The tool of claim 1 wherein said edge of said tool guide means forms a straight line.

5. The tool of claim 4 wherein one of said roller means is positioned between said tool body and said tool guide means.

6. The tool of claim 1 further comprising roller means mounted in said body above said passageway for rotation about an axis of rotation parallel to said planar surface and positioned to contact the upper surface of said strip.

7. The tool of claim 1 wherein said lower surface of said body comprises roller menas for contacting said planar surface.

* * * * *